June 26, 1951  G. M. STEIN  2,558,110

THREE-PHASE TRANSFORMER CORE

Filed May 15, 1948

WITNESSES:
Robert C. Baird
New. L. Groome

INVENTOR
Gerhard M. Stein.
BY
Franklin E. Hardy
ATTORNEY

Patented June 26, 1951

2,558,110

UNITED STATES PATENT OFFICE 2,558,110

THREE-PHASE TRANSFORMER CORE

Gerhard M. Stein, Sharon, Pa., assignor to Westinghouse Electric Corporation, East Pittsburgh, Pa., a corporation of Pennsylvania Application May 15, 1948, Serial No. 27,249

9 Claims. (Cl. 175—356)

My invention relates to electrical induction apparatus such as transformers and particularly to the core or magnetic circuit structure thereof, and to the method of making the same. More particularly, my invention relates to the core structures of three-phase induction apparatus used with alternating current electric circuits in which separate sets of phase windings are provided for connection to the separate phases of a three-phase circuit.

My invention relates particularly to core structures for electrical transformers formed of layers of magnetic sheet steel ribbon having preferred magnetic characteristics in the direction of the sheet from which the core parts are formed, the layers of steel sheets or laminations being bonded together to form brick-like sections having butt joints at their adjoining faces.

It has been found that if a core is formed of layers of sheet steel having the most favorable magnetic characteristics in the direction in which the magnetic flux passes through the strip or sheet of steel, a core having high permeability and low watts loss will result.

To properly take advantage of the properties of such steel, it is necessary that the steel be so used that the direction of magnetization of the steel coincides substantially with the grain or direction of rolling of the steel so that the lines of magnetic flux shall not pass through the steel at an appreciable angle from the direction of rolling.

Core structures have been built formed of successive layers of magnetic sheet material wound flatwise layer upon layer and bonded together by filling the spaces between successive layers or turns of magnetic materials with bonding or filling material, thereby providing a solid or non-yielding laminated structure having a film interlayer bond for all portions of the layers of sheet steel which is beneficial in producing a true and relatively smooth cut surface forming the faces of the butt joints.

In Patent No. 2,293,951, issued to J. B. Seastone and C. C. Horstman, August 25, 1942, for Induction Apparatus, and Method of Core Construction Therefor, and assigned to the same assignee as this application, a development in the formation of low-loss butt joints is disclosed in which chemically inert bonding material is applied to the laminations. The core is cut, worked and etched to remove parts which could electrically connect adjacent laminations.

It has been the usual practice in building core structures for use in distribution or power transformers to employ stacks of layers of thin sheets or laminations of magnetic material shaped as L plates. These L plates are stamped or punched from sheets of silicon steel, and it is necessary that a compromise in the direction of cutting be made which gives poorer magnetic qualities than when the lines of magnetic flux pass through the steel in the optimum direction. When the core structure is built up from L-shaped or I-shaped plates, the individual sheets are placed layer upon layer to form the core, those in the winding leg extending through the opening in the winding structure. The joints between the successive layers are formed by overlapping the ends of the sheets forming one core member with the ends of the sheets in an adjacent layer forming another core member to form the well-known lap joint. This type of core structure does not lend itself well to the use of high permeability, low watts loss steel which must be used in such manner that the flux passes through the sheets of steel in the direction of rolling.

There are a number of well known forms of polyphase cores. In one well known form of polyphase core, the separate winding legs accommodating the several phase windings are arranged in a straight line row in parallel relation to each other. There are three magnetic circuit paths in a three-phase transformer of this character, one path extends through the first and second winding legs, one through the second and third winding legs, and the other through the first and third winding legs. The path through the first and third winding legs starting at either end of the structure is necessarily a relatively long magnetic circuit path while the other two magnetic circuit paths are relatively short, thus unbalancing the reluctance of the three paths. In accordance with the invention as later explained, the core parts are so arranged as to result in a shorter magnetic circuit between the first and third winding legs of the structure and to substantially equalize the lengths of the three magnetic circuit paths, thus bringing the magnetic characteristics of the three paths into substantial balance.

In another well known form of polyphase core, the several winding leg members of the structure extend radially outwardly from a central axis and are equally spaced from one another. A great deal of difficulty is experienced in making mechanically and magnetically efficient joints between the radially extending members. In accordance with the invention, core members are arranged at right angles to each other and this difficulty in forming the joints is readily overcome since it is much easier to make efficient joints between the members of the core extending at right angles to each other than between members extending in other directions.

It is an object of the present invention to provide a low-loss core structure for use in polyphase electrical apparatus in which a plurality of winding core legs of magnetic material are employed, and each is formed of sheets of magnetic material positioned flatwise layer upon layer and bent to form to the configuration of the member in which the sheets are employed. The layers or sheets of magnetic material may be bonded together as above described or may be unbonded and relatively free to move slightly with respect to adjacent layers.

It is a further object of the invention to provide a transformer core of the above-indicated character in which the parts of the core are so formed and related as to largely eliminate the unbalance in the reluctance of the three magnetic circuit paths characteristic of a core structure in which the three winding connections are arranged in parallel relation and in a straight line row, and to also largely eliminate the difficulties in forming the center in the form of polyphase core structure in which the several winding leg members of the structure extend radially outwardly from a central axis and are equally spaced from one another circumferentially about this axis.

In accordance with the invention, the core parts are arranged to provide a substantially rectangular core loop having two winding legs comprising two opposite sides of the rectangular core loop, the remaining two sides of the rectangular loop constitute the yoke portions connecting the ends of the leg portions of the core. A half-core loop is added having a single winding leg portion and yoke portions extending from the ends of the leg portion at substantially right angles therefrom joining the yoke portions of the full core loop.

In a core of this construction, the laminations may be bonded together to form solid blocks of lamination layers, the bonded laminations cut to form butt joints and the butt joint surfaces worked to form smooth flat surfaces comprising the adjacent surfaces of low-loss butt joints, or the lamination layers may be unbonded and the joints between the core joints formed by overlap or interleaving successive layers of laminations at the joints to provide more flexible core leg parts than that resulting from the bonded core structure.

Other objects and advantages of the invention will be apparent from the following description of a preferred embodiment thereof, reference being had to the accompanying drawing, in which.

Figure 1:
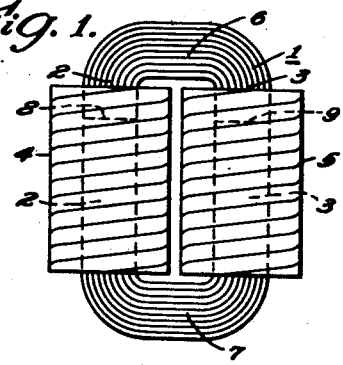
Figure 1 is a side elevational view of a core and coil assembly employing a single core loop having two winding legs in accordance with the prior art practice.

Referring to the drawing, a single core loop magnetic structure 1 is illustrated in Fig. 1, consisting of a plurality of layers of a strip of magnetic material wound continuously layer upon layer to provide a plurality of layers or sheets of steel outlining a substantially rectangular window and having two parallel winding leg portions 2 and 3 about which are positioned windings 4 and 5, respectively. The leg portions 2 and 3 are joined at their ends by connecting yoke portions 6 and 7 and are cut to form butt joints at 8 and 9 to separate the core loop into two core sections in a well known manner.

Figure 2:
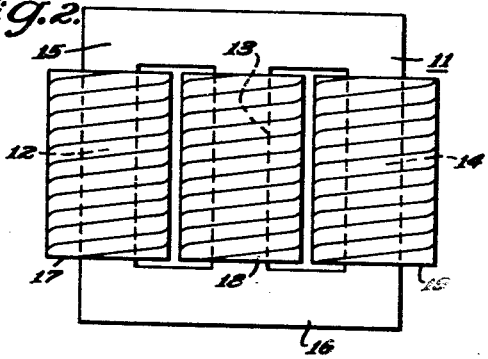
Fig. 2 is a side elevational view of a three-phase core formed of stacked laminations having three winding legs organized in accordance with prior art practice.

Fig. 2 illustrates a three-phase core 11 having three winding leg portions 12, 13 and 14 arranged in a straight line row and connected together by yoke portions 15 and 16 at the upper and lower ends of the leg portions, respectively. In the three-phase core illustrated in Fig. 2, there are three magnetic circuit paths through which the magnetic flux travels. One of these paths includes the core legs 12 and 13 surrounded by phase windings 17 and 18, respectively, another path includes the core legs 13 and 14 surrounded by the phase windings 18 and 19, respectively, and the other path extends through the core legs 12 and 14 surrounded by the phase windings 17 and 19, respectively. It is apparent from the arrangement of the three core legs illustrated in Fig. 2 that the first two mentioned paths, each of which includes two adjacent winding legs, are shorter than the third path which includes the first and third of the three winding legs. This results in an unbalance in the reluctance of the three magnetic circuit paths which is undesirable.

In accordance with the present invention, as illustrated in Figs. 3, 4, 5 and 6, a three-phase core is employed in which the two outer winding legs of the core are brought close together shortening the iron circuit of the three-phase construction shown in Fig. 2, and the middle winding leg is positioned offset from the first and third winding legs, the middle leg connecting through yoke portions at the upper and lower ends thereof which extend at right angles to the direction of the middle leg and at right angles to the yoke portions connecting the first and third winding legs of the core.

Figure 3:
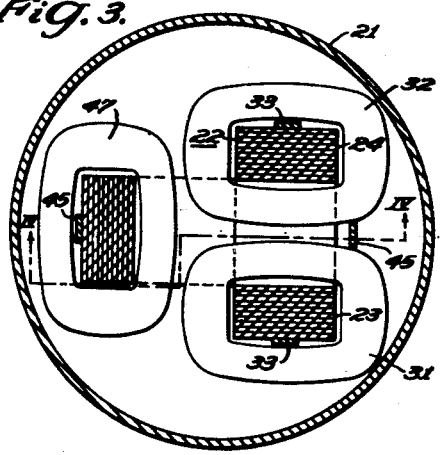
Fig. 3 is a horizontal cross-sectional view of a core and coil assembly constructed in accordance with the invention and taken along the broken line III—III of Fig. 4, and also showing the wall of an enclosing casing.
Figure 4:
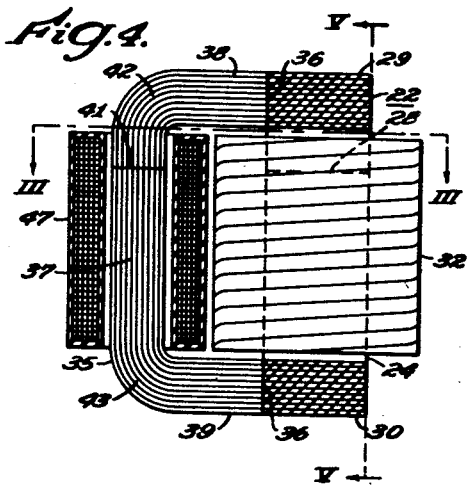
Fig. 4 is a vertical sectional view of the core and coil assembly shown in Fig. 3, taken along the broken line IV—IV of Fig. 3, with the banding straps omitted for clarity.
Figure 5:
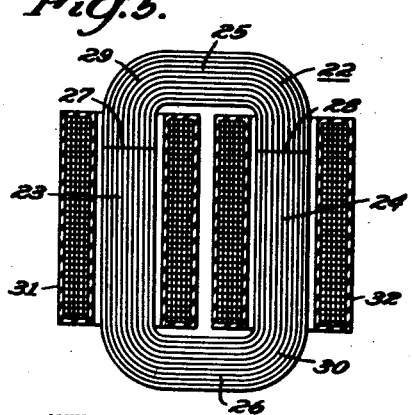
Fig. 5 is a front elevational view, partly in section, taken along the broken line V—V in Fig. 4.
Figure 6:
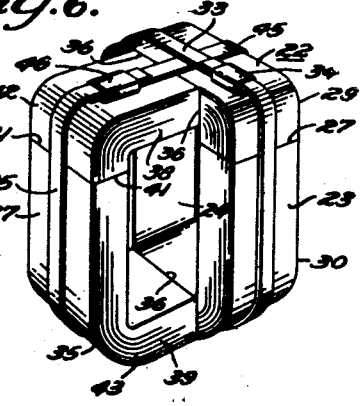
Fig. 6 is a perspective view of the core shown in Figs. 3, 4 and 5.

Thus the outer magnetic circuit is shortened and the three magnetic circuit paths are made substantially equal in length so that the magnetic flux may interchange freely between all three winding legs of the core. In accordance with the invention, as illustrated in the embodiment shown in Figs. 3 to 6, a tank or casing 21 in Fig. 3 is provided and a substantially rectangular core loop 22 of magnetic sheet material is provided within the tank 21 having two opposite sides 23 and 24 providing winding leg portions, the remaining two opposite sides 25 and 26 of the rectangle serving as yoke portions.

The core loop 22 is formed of successive layers of magnetic sheet material wound flatwise layer upon layer and bonded together by filling the spaces between the successive layers or turns of magnetic material with bonding or filling material, thereby providing a solid or non-yielding laminated structure having a film interlayer bond for all portions of the layers of sheet steel, which is beneficial in producing a true cut surface forming the face of the butt joints.

When the steel ribbon forming the core is so wound layer upon layer, the layers bonded together to form a solid loop structure is cut at 27 and 28 into separate upper and lower sections 29 and 30 so that the upper and lower sections of the core may be assembled with the winding leg portions extending through the windows in the coil structures 31 and 32. The laminations of the resulting separable sections are held together as a solid mass so that there is no vibration or relative movement of the layers.

It has been found desirable to work the meeting faces between the separable core sections in order to provide smooth flat surfaces at the butt joint that are adapted to join and provide a minimum air gap. It has been found desirable to insulate the magnetic material between the separable sections of the core meeting at the butt joints. Material suitable for this purpose may be one of the combinations of long chain molecules of the alvar or vinylite type or other oil and acid resisting resins. These materials are somewhat thermoplastic and have the property of tenaciously adhering to the metal surfaces. It is necessary to bring the core faces together under pressure to reduce the thermoplastic material to the predetermined thickness. When the sections are assembled about the coil structure as above described, a banding or clamping strap 33 is applied to the core loop 22 extending thereabout and stretched by means of a tool which attaches the ends of the strap to form a coupling 34 while the strap 33 is under tension.

A half-core loop 35 is provided that is formed similarly to the core loop 22 and cut in two halves so that one half of the completed loop is used with one three-phase core unit, the half-core loop 35 joining the core loop 22 at the upper and lower ends forming butt joints at 36. The adjoining surfaces of the butt joints are worked smooth to provide smooth flat surfaces at the butt joints to provide a minimum air gap, thus resulting in low-loss joints.

The half-loop part 35 of the core structure comprises a straight winding leg portion 37 and two yoke portions 38 and 39 bent at substantially right angles to the direction of the leg portion 37 and terminating at the smooth butt joints 36, thus bringing all three leg portions together in a common location at the top and bottom of the core structure and providing three magnetic circuit paths in parallel between the areas of union of the three winding legs through the yoke portions at the upper end of the core and the yoke portions at the lower end of the winding leg portions.

A butt joint 41 is provided in the winding leg 37 that is similar to the joints 27 and 28 in the other winding leg portions of the core, thus dividing the half-loop portion 35 into upper and lower sections 42 and 43, respectively. A steel band or strap 45 may be provided holding the half-loop core part 35 in place against the loop core part 22 and also holding the upper and lower sections 42 and 43 of the core part 35 together. The ends of the band 45 are held under tension and fastened by a clamp 46 in a manner similar to the application of the clamp 34 to the steel strap 33.

A set of phase windings 47 is provided about the winding leg 37 in the same manner as the phase windings 31 and 32 are applied about the winding legs 23 and 24.

It will be observed that, with the three winding legs positioned as shown in Figs. 3 to 6, the several sets of phase windings about the winding legs of the core are positioned further from one another than in the arrangement shown in Fig. 2, thus allowing the cooling liquid in which the transformer is submerged free access to the outer surface of the winding. This allows much better cooling of the winding structure than the arrangement of the windings shown in Fig. 2 where the winding located on the middle core leg is cooled only at the ends and on two sides, the other sides being largely covered by the two outer windings.

It will be understood by those skilled in the art that modifications may be made in the details of the structures illustrated and described without departing from the spirit of my invention, and I do not wish to be limited otherwise than by the scope of the attached claims.

I claim as my invention:

1. In a three-phase core structure for electrical apparatus having three winding legs arranged in parallel relation, in combination, a substantially rectangular core loop formed of superimposed layers of magnetic sheet material bent flatwise to conform to the shape of the loop, two opposite sides of the loop comprising winding leg core portions and the remaining two sides comprising yoke core portions connecting the ends of the winding leg core portions together in the loop, a half-core loop member having the layers of magnetic sheet material bent flatwise to conform to the shape of the half-core loop and having a substantially straight winding leg portion and two connecting yoke portions substantially at right angles to the winding leg portion, the two yoke ends of the half-core loop member being joined with yoke portions of the rectangular core loop member, forming three parallel magnetic circuit portions extending between common junction parts of the structure in the form of a T.

2. In a three-phase core structure for electrical apparatus having three winding legs arranged in parallel relation, in combination, a substantially rectangular core loop member formed of superimposed layers of magnetic sheet material bent flatwise to conform to the shape of the loop, two opposite sides of the loop comprising winding leg core portions and the remaining two sides comprising yoke core portions connecting the ends of the winding leg core portions together in the loop, a half-core loop formed of superimposed layers of magnetic sheet material bent flatwise to conform to the shape of the half-core loop member and having a substantially straight winding leg portion and two connecting yoke portions substantially at right angles to the winding leg portion, the superimposed layers of magnetic sheet material forming the substantially rectangular core loop member and the half-core loop member being bonded together by bonding material applied to the sheets of magnetic material, the half-loop core member having faces worked on the ends of the yoke portions thereof engaging with similarly worked faces on the side of the yoke portions of the rectangular core loop member to form low-loss butt joints between the two members, forming three parallel magnetic circuit portions extending between common junction parts of the structure in the form of a T.

3. In a three-phase core structure for electrical apparatus having three winding legs arranged in parallel relation, in combination, a substantially rectangular core loop formed of superimposed layers of magnetic sheet material bent flatwise to conform to the shape of the loop, two opposite sides of the loop comprising winding leg core portions and the remaining two sides comprising yoke core portions connecting the ends of the winding leg core portions together in the loop, a half-core loop member having the layers of magnetic sheet material bent flatwise to conform to the shape of the half-core loop and having a substantially straight winding leg portion and two connecting yoke portions substantially at right angles to the winding leg portion, the two yoke ends of the half-core loop member being joined with yoke portions of the rectangular core loop member, the core structure having separable upper and lower core parts meeting at joints in each of the three winding leg portions of the core, providing three upper core leg parts uniting at a common upper core joint and three lower core leg parts uniting at a common lower core joint, the three legged upper and lower core parts uniting to form three parallel magnetic circuit paths arranged in the form of a T.

4. In a three-phase core structure for electrical apparatus having three winding legs arranged in parallel relation, in combination, a substantially rectangular core loop member formed of superimposed layers of magnetic sheet material bent flatwise to conform to the shape of the loop, two opposite sides of the loop comprising winding leg core portions and the remaining two sides comprising yoke core portions connecting the ends of the winding leg core portions together in the loop, a half-core loop formed of superimposed layers of magnetic sheet material bent flatwise to conform to the shape of the half-core loop member and having a substantially straight winding leg portion and two connecting yoke portions substantially at right angles to the winding leg portion, the superimposed layers of magnetic sheet material forming the substantially rectangular core loop member and the half-core loop member being bonded together by bonding material applied to the sheets of magnetic material, the half-loop core member having faces worked on the ends of the yoke portions thereof engaging with similarly worked faces on the side of the yoke portions of the rectangular core loop member to form low-loss butt joints between the two members, the core structure comprising separable upper and lower core parts, the separable core parts having meeting faces worked thereon for providing butt joints in the several leg portions of the core, providing a three legged upper core part and a three legged lower core part, the three legged upper and lower core parts uniting to form three parallel magnetic circuit paths between common upper and lower joints, the three paths being arranged in the form of a T.

5. A three-phase core structure for electrical induction apparatus comprising, in combination, a substantially rectangular core loop member formed of superimposed layers of magnetic sheet material bent flatwise to conform to the shape of the loop, two opposite sides of the loop comprising winding leg core portions and the remaining two sides comprising yoke core portions connecting the ends of the winding leg core portions together in the loop, a half-core loop formed of superimposed layers of magnetic sheet material bent flatwise to conform to the shape of the half-core loop member and having a substantially straight winding leg and two connecting yoke portions substantially at right angles to the winding leg portion, the half-core loop being disposed in a plane at right angles to the plane of the rectangular core loop and with the ends of its yoke portions butting the sides of the corresponding yoke portions of the rectangular core loop to form three parallel magnetic circuit portions extending between common junction parts of the structure in the form of a T.

6. In a three-phase core structure for electrical apparatus having three winding legs arranged in parallel relation, in combination, a substantially rectangular core loop formed of superimposed layers of magnetic sheet material bent flatwise to conform to the shape of the loop, two opposite sides of the loop comprising winding leg core portions and the remaining two sides comprising unbroken yoke core portions connecting the ends of the winding leg core portions together in the loop, a half-core loop member having the layers of magnetic sheet material bent flatwise to conform to the shape of the half-core loop and having a substantially straight winding leg portion and two connecting yoke portions substantially at right angles to the winding leg portion, the two yoke ends of the half-core loop member being joined with the unbroken yoke portions of the rectangular core loop member, forming three parallel magnetic circuit portions extending between common junction parts of the structure in the form of a T.

7. In a three-phase core structure for electrical apparatus having three winding legs arranged in parallel relation, in combination, a substantially rectangular core loop member formed of superimposed layers of magnetic sheet material bent flatwise to conform to the shape of the loop, two opposite sides of the loop comprising winding leg core portions and the remaining two sides comprising unbroken yoke core portions connecting the ends of the winding leg core portions together in the loop, a half-core loop formed of superimposed layers of magnetic sheet material bent flatwise to conform to the shape of the half-core loop member and having a substantially straight winding leg portion and two connecting yoke portions substantially at right angles to the winding leg portion, the superimposed layers of magnetic sheet material forming the substantially rectangular core loop member and the half-core loop member being bonded together by bonding material applied to the sheets of magnetic material, the half-loop core member having faces worked on the ends of the yoke portions thereof engaging with similarly worked faces on the side of the unbroken yoke portions of the rectangular core loop member to form low-loss butt joints between the two members, forming three parallel magnetic circuit portions extending between common junction parts of the structure in the form of a T.

8. In a three-phase core structure for electrical apparatus having three winding legs arranged in parallel relation, in combination, a substantially rectangular core loop formed of superimposed layers of magnetic sheet material bent flatwise to conform to the shape of the loop, two opposite sides of the loop comprising winding leg core portions and the remaining two sides comprising unbroken yoke core portions connecting the ends of the winding leg core portions together in the loop, a half-core loop member having the layers of magnetic sheet material bent flatwise to conform to the shape of the half-core loop and having a substantially straight winding leg portion and two connecting yoke portions substantially at right angles to the winding leg portion, the two yoke ends of the half-core loop member being joined with the unbroken yoke portions of the rectangular core loop member, the core structure having separable upper and lower core parts meeting at joints in each of the three winding leg portions of the core, providing three upper core leg parts uniting at a common upper core joint and three lower core leg parts uniting at a common lower core joint, the three legged upper and lower core parts uniting to form three parallel magnetic circuit paths arranged in the form of a T.

9. A three-phase core structure for electrical induction apparatus comprising, in combination, a substantially rectangular core loop member formed of superimposed layers of magnetic sheet material bent flatwise to conform to the shape of the loop, two opposite sides of the loop comprising winding leg core portions and the remaining two sides comprising unbroken yoke core portions connecting the ends of the winding leg core portions together in the loop, a half-core loop formed of superimposed layers of magnetic sheet material bent flatwise to conform to the shape of the half-core loop member and having a substantially straight winding leg and two connecting yoke portions substantially at right angles to the winding leg portion, the half-core loop being disposed in a plane at right angles to the plane of the rectangular core loop and with the ends of its yoke portions butting the sides of the corresponding unbroken yoke portions of the rectangular core loop to form three parallel magnetic circuit portions extending between common junction parts of the structure in the form of a T.

GERHARD M. STEIN.

REFERENCES CITED

The following references are of record in the file of this patent:

UNITED STATES PATENTS

| Number | Name | Date |
| --- | --- | --- |
| 2,293,951 | Seastone et al. | Aug. 25, 1942 |
| 2,367,927 | Chubb | Jan. 23, 1945 |
| 2,374,449 | Mulcahy | Apr. 24, 1945 |
| 2,447,673 | Steinert | Aug. 24, 1948 |
| 2,456,459 | Somerville | Dec. 14, 1948 |
| 2,456,461 | Dunn | Dec. 14, 1948 |
| 2,516,164 | Vienneau | July 25, 1950 |